United States Patent [19]
Collins et al.

[11] Patent Number: 6,071,575
[45] Date of Patent: Jun. 6, 2000

[54] VACUUM GLAZING

[75] Inventors: Richard Edward Collins, Riverstone; Jian-Zheng Tang, Merrylands, both of Australia

[73] Assignee: University of Sydney, Australia

[21] Appl. No.: 09/220,185

[22] Filed: Dec. 22, 1998

Related U.S. Application Data

[62] Division of application No. 08/817,791, filed as application No. PCT/AU95/00640, Sep. 28, 1995, Pat. No. 5,891,536.

[30] Foreign Application Priority Data

Oct. 19, 1994 [AU] Australia ............................. PM8889

[51] Int. Cl.$^7$ ........................................... E06B 3/66
[52] U.S. Cl. ............................ 428/34; 428/120; 156/107; 156/109; 52/786.1
[58] Field of Search ............................ 428/34, 120, 192, 428/428, 430; 156/107, 109; 52/786.1, 786.13

[56] References Cited

U.S. PATENT DOCUMENTS

| | | |
|---|---|---|
| 1,370,974 | 3/1921 | Kirlin . |
| 2,401,552 | 6/1946 | Cox . |
| 3,783,084 | 1/1974 | Quenett . |
| 3,916,871 | 11/1975 | Estes et al. . |
| 3,936,553 | 2/1976 | Rowe . |
| 3,990,201 | 11/1976 | Falbel . |
| 4,132,218 | 1/1979 | Bennett . |
| 4,169,985 | 10/1979 | Ernsthausen et al. . |
| 4,180,426 | 12/1979 | Oustin et al. . |
| 4,367,108 | 1/1983 | Valimont et al. . |
| 4,647,327 | 3/1987 | Rase . |
| 4,683,154 | 7/1987 | Benson et al. . |
| 4,786,344 | 11/1988 | Beuther . |
| 5,009,218 | 4/1991 | Bächli . |
| 5,107,649 | 4/1992 | Benson et al. . |
| 5,124,185 | 6/1992 | Kerr et al. . |
| 5,154,953 | 10/1992 | de Moncuit et al. ..................... 428/34 |
| 5,270,084 | 12/1993 | Parker . |
| 5,657,607 | 8/1997 | Collins et al. . |
| 5,664,395 | 9/1997 | Collins et al. . |

FOREIGN PATENT DOCUMENTS

| | | |
|---|---|---|
| 210 104 | 7/1957 | Australia . |
| 16618/67 | 7/1969 | Australia . |
| B-67280/87 | 11/1990 | Australia . |
| 61738/90 | 4/1991 | Australia . |
| PCT/AU90/ 00364 | 5/1991 | Australia . |
| 1290624 | 10/1991 | Canada . |
| 0 047 725 B1 | 12/1985 | European Pat. Off. . |
| 0 421 239 A2 | 4/1991 | European Pat. Off. . |
| 0 247 098 B1 | 3/1992 | European Pat. Off. . |
| 0 645 516 A2 | 3/1995 | European Pat. Off. . |
| 0489 042 B1 | 6/1996 | European Pat. Off. . |
| 2294315 | 12/1974 | France . |
| 2300860 | 10/1976 | France . |
| 2 367 180 | 5/1978 | France . |
| 2 483 564 | 12/1981 | France . |
| 387655 | 1/1924 | Germany . |
| 1 046 294 | 12/1958 | Germany . |
| 2 152 071 | 2/1973 | Germany . |
| 25 20 062 A1 | 11/1976 | Germany . |
| 29 51 330 A1 | 7/1981 | Germany . |
| 36 15 179 A1 | 2/1987 | Germany . |
| 5-302477 | 11/1993 | Japan . |
| 588 008 | 5/1977 | Switzerland . |
| 683855 | 12/1950 | United Kingdom . |
| 1 100 837 | 1/1968 | United Kingdom . |
| 1 108 593 | 4/1968 | United Kingdom . |
| WO 93/15296 | 9/1993 | WIPO . |
| WO 94/24398 | 10/1994 | WIPO . |
| WO 95/01493 | 1/1995 | WIPO . |

Primary Examiner—Donald Loney
Attorney, Agent, or Firm—Kennedy Covington Lobdell & Hickman, LLP

[57] ABSTRACT

A vacuum glazing comprises two sheets of glass hermetically sealed around the edge with a thermally insulating internal vacuum, and an array of support pillars placed between the glass sheets, wherein one of the sheets of glass is laminated, after the vacuum glazing has been manufactured.

4 Claims, 1 Drawing Sheet

VACUUM GLAZING

This is a U.S. divisional patent application claiming priority under 35 U.S.C. §120 from allowed U.S. patent application Ser. No. 08/817,791 filed Apr. 18, 1997, now U.S. Pat. No. 5,891,536 for Design Improvements to Vacuum Glazing, which is a national patent application of international patent application serial no. PCT/AU95/00640 filed Sep. 28, 1995, which in turn claims priority under 35 U.S.C. §119 to Australian patent application Ser. No. PM 8889 filed Oct. 19, 1994.

INTRODUCTION

This invention concerns design improvements to vacuum glazing. Vacuum glazing consists of two sheets of glass, hermetically sealed around the edge, with a thermally insulating internal vacuum. In order to maintain the separation of the glass sheets under the influence of the large forces due to atmospheric pressure, an array of very small support pillars is placed over the surface of the glass sheets.

BACKGROUND OF THE INVENTION

The manufacture of vacuum glazing requires that the temperature of the glass sheets forming the glazing be held at a high value whilst the solder glass edge seal is formed. This process essentially prevents the use of heat tempered glass for the manufacture of glazing, because the high temperature edge forming process removes most of the temper from the glass. It is also not possible to use conventional laminated glass for the glazing because the temperatures required for formation of the edge seal cause the plastic adhesive in laminated glass to deteriorate.

SUMMARY OF THE INVENTION

According to the present invention there is provided a vacuum glazing comprising two sheets of glass, hermetically sealed around the edge, with a thermally insulating internal vacuum, and an array of support pillars placed between the glass sheets, wherein at least one of the sheets of glass is laminated after the vacuum glazing has been manufactured.

According to a further aspect, the invention provides a method of manufacturing vacuum glazing, comprising the steps of:

holding the glass sheets at a high temperature while a solder glass edge seal is formed; and subsequently laminating at least one of the glass sheets with a further sheet of glass.

This procedure may consist of placing a layer of plastic material on one surface of the glazing, and then locating the further glass sheet above this material. The entire assembly is forced together, and then heated to a temperature at which the plastic material softens and bonds to both sheets. The lamination may be performed on one side of the glazing only, or on both sides, as desired. This method of manufacture overcomes the problems associated with the inability of the laminated glass to withstand the high temperature edge sealing process. The vacuum glazing itself is, however, quite capable of withstanding the relatively low temperatures associated with the formation of the bonding between the glass sheets during the laminating process.

BRIEF DESCRIPTION OF DRAWINGS

The invention will now be described, by way of example only, with reference to the accompanying drawings, in which.

DETAILED DESCRIPTION OF THE PREFERRED EMBODIMENT

Figure 1A:
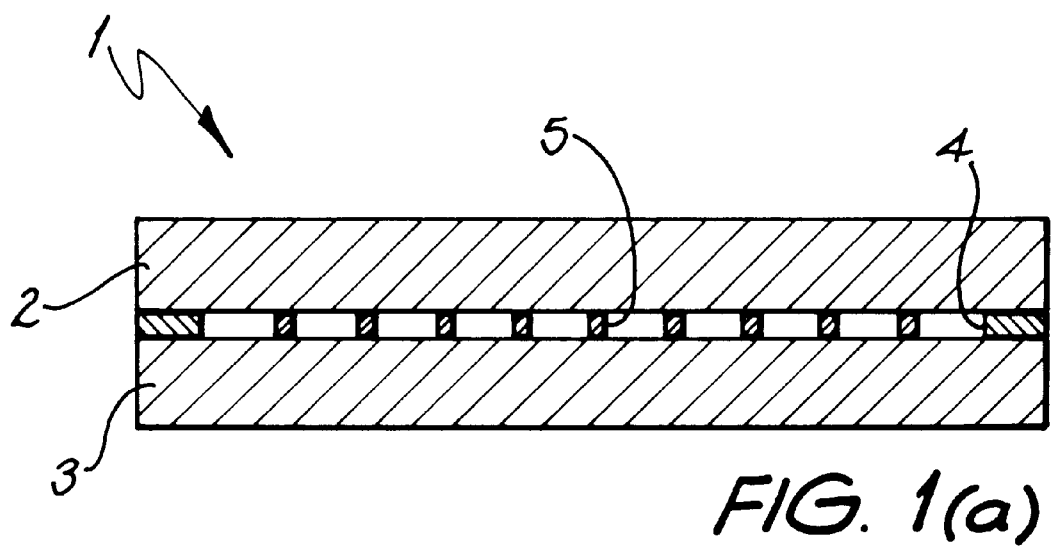
FIG. 1a illustrates a step in the manufacture of a laminated vacuum glazing in accordance with an embodiment of the invention.
Figure 1B:
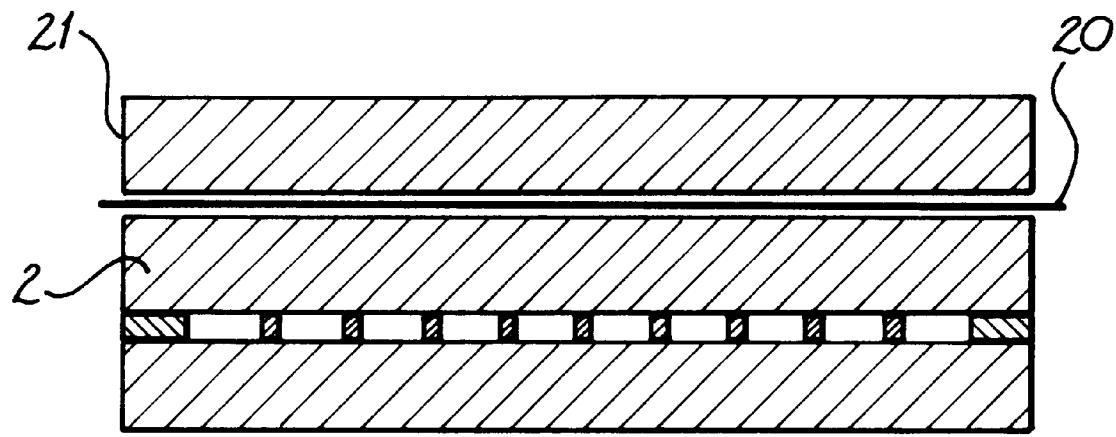
FIG. 1b illustrates a second step in the manufacture of a laminated vacuum glazing in accordance with an embodiment of the invention.
Figure 1C:
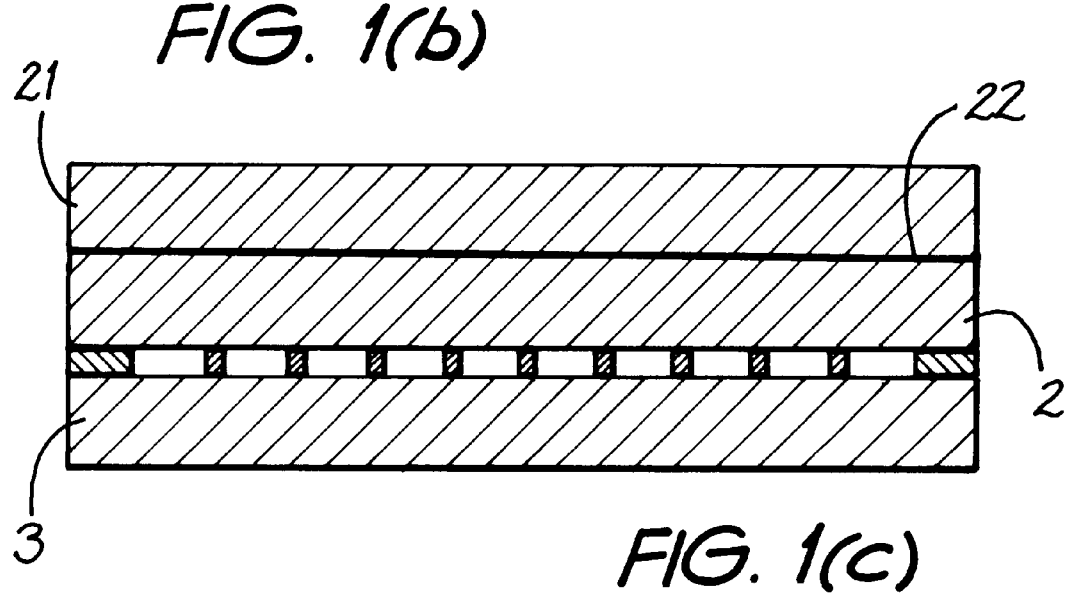
FIG. 1c illustrates a third step in the manufacture of a laminated vacuum glazing in accordance with an embodiment of the invention.

In FIGS. 1a, 1b, 1c the steps in a process of producing a laminated evacuated panel are illustrated. First the evacuated panel is produced as shown in FIG. 1a. Then a layer of plastic laminate material 20 is placed on one surface of the glazing. A further glass sheet 21 is located above this material as shown in FIG. 1b. The entire assembly is forced together, and then heated to a temperature at which the plastic material 20 softens and bonds to both sheets of glass 2 and 21 as shown in FIG. 1c. The laminating process may be performed on one or both sides of the glazing to produce a laminated evacuated panel.

Although this invention has been described with reference to specific embodiments it should be appreciated that it could be embodied in other forms.

What is claimed is:

1. A vacuum glazing comprising two sheets of glass hermetically sealed around the edge by a solder glass edge seal with a thermally insulating internal vacuum, and an array of support pillars placed between the glass sheets, wherein one of the sheets of glass is laminated to a further sheet of glass.

2. A method of manufacturing a vacuum glazing, the vacuum glazing comprising two sheets of glass hermetically sealed around the edge with a thermally insulating internal vacuum, and an array of support pillars placed between the glass sheets, the method comprising the steps of:

holding the glass sheets at a high temperature while a solder glass edge seal is formed; and subsequently laminating at least one of the glass sheets with a further sheet of glass.

3. A method according to claim 2, wherein the procedure consists of:

placing a layer of plastic material on one surface of the glazing, and then locating the further glass sheet above this material;

forcing the entire assembly together; and then heating the assembly to a temperature at which the plastic material softens and bonds to both sheets.

4. A method according to claim 3, wherein the laminating process is performed on both sides of the vacuum glazing.

* * * * *